(No Model.)
E. B. WILLIAMS.
GATE FOR TURBINE WHEELS.
No. 271,671. Patented Feb. 6, 1883.
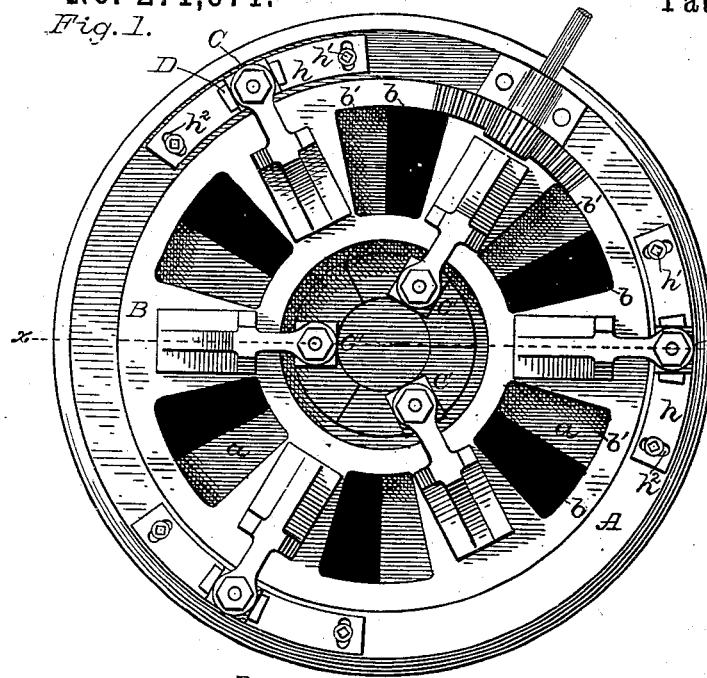
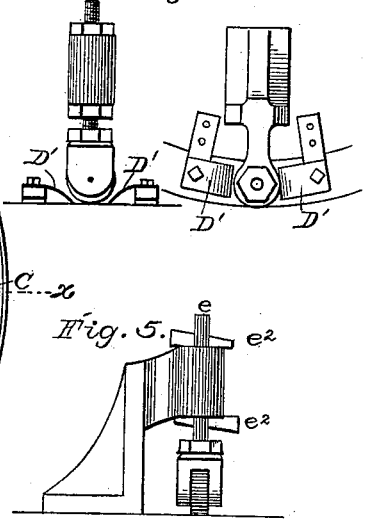
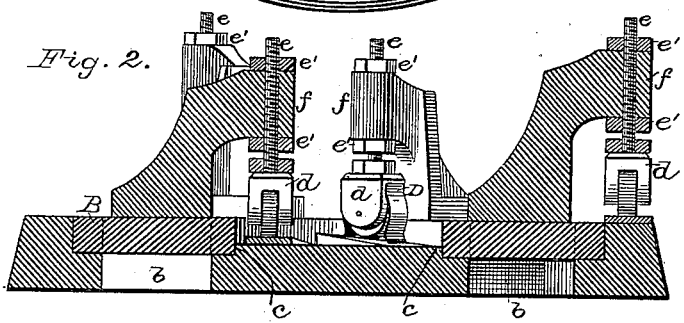
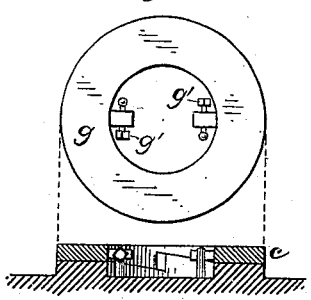
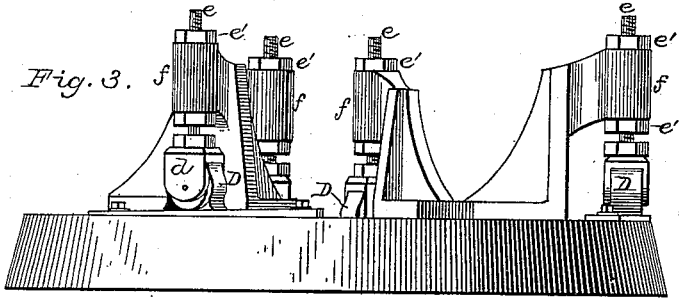
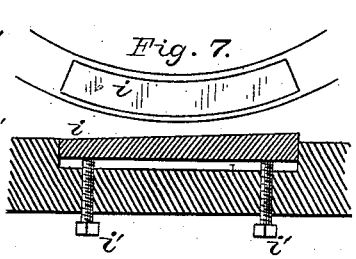
Attest:
Philip F. Larner.
Howell Bartle.
Inventor:
Eben Bancroft Williams.
By
Attorney.

UNITED STATES PATENT OFFICE.

EBEN B. WILLIAMS, OF FORESTDALE, RHODE ISLAND, ASSIGNOR OF ONE-HALF TO DANIEL D. EARLE, OF SAME PLACE.

GATE FOR TURBINE WHEELS.

SPECIFICATION forming part of Letters Patent No. 271,671, dated February 6, 1883.

Application filed October 21, 1882. (No model.)

*To all whom it may concern:*

Be it known that I, EBEN BANCROFT WILLIAMS, of Forestdale, in the county of Providence and State of Rhode Island, have invented certain new and useful Improvements in Gates for Turbine Wheels; and I do hereby declare that the following specification, taken in connection with the drawings furnished and forming a part of the same, is a clear, true, and complete description of the several features of my invention.

My improvements relate to what are known as "register-gates," and their object is to provide for a minimum of friction between the gate and its seat, coupled with an adjusting capacity, whereby wasteful leakage of water may be practically obviated; and in attaining these ends I employ, for supporting the gate, an inner and an outer series of wheels and certain novel tread-bearings therefor, which are adjustable with relation to each other, and to provide against extraneous solid matters being deposited between said supporting-wheels and their tread-bearings I have devised clearers or brushes, which sweep the tread-bearings in advance of each wheel, thus practically obviating the lifting of the gate from its seat by solid matters, otherwise liable to be overridden by the supporting-wheels.

I am aware that rolling ball-bearings have heretofore been employed for supporting the register-gates of turbines without any capacity for adjustment to obviate the waste of water as the balls and their contact-surfaces become worn.

I am also aware that supporting-wheels have also been employed, so as to afford inner and outer bearings for the gate; but, so far as my knowledge extends, such wheels and their bearings have never heretofore been adjustable with reference to each other.

I am still further aware that register-gates have been supported wholly at their peripheries by rollers, which, like the balls, were rolled or trundled to and fro in beds or bearings prepared for them, and that said beds or bearings have been vertically adjustable for gradually lowering the gate to its seat to compensate for wear; but such rollers cannot be practically employed for affording central supports for the gate, as is now provided for by me in the use of wheels.

After a detailed description of a turbine register-gate embodying my improvements the features deemed novel will be specified in the several claims hereunto annexed.

Referring to the drawings, Figure 1 is a top view of a register-gate with my improvements applied thereto. Fig. 2 is a lateral vertical section of said gate on line $x$. Fig. 3 is a side view of said gate. Fig. 4 is a side and top view of a modification of the tread-clearers shown in Fig. 3. Fig. 5 is a side view of a detached supporting-wheel and its standard, provided with means for adjusting the wheel differing from those shown in the previous figures. Fig. 6 is a top view and diametrical section of an adjustable central or inner wheel tread-bearing differing from those shown in the previous figures. Fig. 7 is a top view and vertical section of an outer adjustable tread-bearing similar to bearings for rollers as heretofore employed, which bearings may be used in combination with the central adjustable wheels and bearings without departure from certain features of my invention.

The gate-curb A is of the usual type, varied in form and construction according to the particular variety of turbine with which it is to be employed. The gate-seat $a$ is usually integral with the curb, and is provided with the requisite number of ports $b$, and at its center it has the usual raised circular portion, as at $c$. The register-gate B fits into the curb around the raised portion $c$ and rests flatly upon the seat $a$, its ports $b'$ substantially corresponding in number, shape, and dimensions with the ports $b$ in said seat. The gate is partially rotated to and fro on its seat by a rack, pinion, and shaft, substantially as heretofore.

In accordance with certain features of my invention, the gate is provided with the outer series of supporting-wheels, C, and the inner series of supporting-wheels, C', respectively, having tread-bearings upon the surface of the curb and the raised disk $c$ at the center of the seat, and said bearings and wheels are adjustable with reference to each other, so as to permit the accurate and convenient adjustment of the gate with reference to its seat, thus providing for a minimum of friction and a practical obviation of wasteful leakage. As preferably constructed by me, each supporting-wheel C is mounted by its axis in a truck, $d$, having a spindle, $e$, housed in a standard, $f$, bolted upon the upper surface of the gate. The truck-spindles are screw-threaded, and are provided with nuts $e'$, whereby said spindles may be longitudinally adjusted in their housings and firmly set in position. These wheels may be varied as to number employed; but ordinarily three wheels in each series will be sufficient for my purpose, and it will be seen in Fig. 1 that the wheels of the inner series are so set with relation to those of the outer series that they alternate and afford successive inner and outer bearings, thus providing for a well-distributed support for the gate and for the water pressing thereon, as in use. In lieu of the threaded stems and nuts, the stems may be slotted and keys $e^2$ employed therewith, as shown in Fig. 5.

Inasmuch as I believe I am the first to provide inner and outer adjustable supporting-bearings for a register-gate, it is to be understood that I do not limit myself to wheels which are adjustable as described, because I am well aware that with non-adjustable wheels the inner and outer tread-bearings may be rendered vertically adjustable, and thereby afford similar results.

As an important feature of my invention I have devised the tread-bearings $h$, which are mounted upon the curb. These bearings are in the form of plates, and are detachable, being secured on the curb by screws $h'$, occupying lateral slots $h^2$, whereby said plates may be readily adjusted laterally, so as to enable new track-surfaces to be presented for the wheels, and thereby to compensate for the undue wear of the tread-bearing from time to time. Said tread-bearings, whether laterally adjustable or not, are in the form of slightly-inclined planes, as shown, so that when the gate is opened by rotation on its seat each outer wheel will ride upward on its respective tread-bearing, and thus lift the gate slightly from its seat, and this feature, so far as my knowledge extends, is wholly new. It will be seen that when the gate is closed the inclined-plane tread-bearings, if properly arranged, will permit the gate to rest upon its seat with exactly the required pressure to secure a desirable water-tight joint therewith, and that the wear of the gate and seat at their coincident surfaces will be reduced to a minimum.

In Fig. 6 I show an annular tread-bearing, $g$, for the inner series of supporting-wheels, with which the wheels need not have their spindles longitudinally adjustable in their housings, because said annular tread-bearing is in itself vertically adjustable, so that it may be lowered bodily from time to time, and thereby to lower the gate upon its seat. This annular central bearing $g$ may be variously constructed and operated; but it is preferably constructed, as shown, with an under annular cam-surface, and resting upon a correspondingly-shaped bed, so that when said bearing is rotated thereon by the screws $g'$ its upper surface will be lowered.

At Fig. 7 I have shown a tread-bearing, $i$, occupying a recess in the top of the curb adjacent to each supporting-wheel, and screws $i'$ for raising said tread-bearings, similar to beds and adjusting-screws heretofore provided for use with rollers which rolled or trundled to and fro at the periphery of the gate; and it is therefore to be understood that I make no claim to said adjustable tread-bearings other than with inclined planes, or in connection with central adjustable tread-bearings, or with a central series of adjustable supporting-wheels, or in connection with supporting-wheels as distinguished from balls or from rollers. The inclined tread-bearings, in their best form, are flat for use with flat-faced wheels; but they may be in the form of a rail for use with wheels having grooved faces, or recessed for the reception of V-faced wheels, without departure from certain features of my invention. The tread-bearings, of whatever form they may be, are liable to have lodged thereon solid matters, which frequently enter the flume, and when overridden by the supporting-wheels would cause a corresponding lift of the gate, and therefore I have provided each wheel with a clearer, D, which scrapes or clears the bearing as the wheel advances. I have shown two forms of clearers; and they may be still further varied in construction and arrangement without departure from my invention.

In Fig. 3 the clearers D are pieces of sheet metal secured to the truck, and bent so as to be in contact with and to scrape the tread-bearing; but in Fig. 4 the clearers D' are mounted upon the top of the gate, near its rim, and overlie and scrape said bearing. In lieu of sheet metal, the clearers may be composed of fine wire, either brass or iron, to operate as a brush; or any other material of sufficient durability may be employed.

In some cases, as when a wheel is to be used where the water is unusually charged with earthy matters, I prefer to have the central raised portion, $c$, of the gate-seat elevated so that its top will be flush with the upper surface of the gate, and of course correspondingly elevate the interior trucks, and the standards therefor may be either higher than those shown or elevated by means of plates inserted between their bases and the gate.

Having thus described my invention, I claim as new and desire to secure by Letters Patent—

1. The combination, with the register-gate, its seat, and curb, of adjustable wheels for said gate, which support it and enable it to be raised from or lowered toward its seat, substantially as described.

2. The combination, with the seat and curb, of the register-gate, adjustably supported by the inner and outer series of supporting-wheels and tread-bearings, substantially as described.

3. The combination, with the curb, the seat, the gate, and outer series of wheels, of the laterally-adjustable tread-bearings for said wheels, substantially as described.

4. The combination, with the curb, the seat, the gate, and supporting-wheels, of the inclined-plane tread-bearings for said wheels, substantially as described, whereby the gate in opening is slightly lifted from its seat, as set forth.

5. The combination, with the register-gate, of a series of supporting-wheels mounted in trucks provided with spindles adjustably housed in standards secured to the gate, substantially as described.

6. The combination, with the register-gate and one or more series of supporting-wheels and tread-bearings, of clearers for sweeping the tread-bearings in advance of each wheel, substantially as described.

EBEN BANCROFT WILLIAMS.

Witnesses:
ALBERT E. JILLSON,
ERWIN J. FRANCE.